US011687460B2

(12) United States Patent
LeBeane et al.

(10) Patent No.: US 11,687,460 B2
(45) Date of Patent: Jun. 27, 2023

(54) NETWORK CACHE INJECTION FOR COHERENT GPUS

(71) Applicant: Advanced Micro Devices, Inc., Sunnyvale, CA (US)

(72) Inventors: Michael W. LeBeane, Austin, TX (US); Walter B. Benton, Austin, TX (US); Vinay Agarwala, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 507 days.

(21) Appl. No.: 15/498,076

(22) Filed: Apr. 26, 2017

(65) Prior Publication Data

US 2018/0314638 A1    Nov. 1, 2018

(51) Int. Cl.
*G06F 12/0817* (2016.01)
*G06F 12/1081* (2016.01)
*G06F 12/0831* (2016.01)
*G06F 12/0813* (2016.01)
*G06F 13/28* (2006.01)

(52) U.S. Cl.
CPC ...... *G06F 12/0828* (2013.01); *G06F 12/0813* (2013.01); *G06F 12/0831* (2013.01); *G06F 12/1081* (2013.01); *G06F 13/28* (2013.01); *G06F 2212/1021* (2013.01); *G06F 2212/154* (2013.01); *G06F 2212/621* (2013.01); *G06F 2212/622* (2013.01)

(58) Field of Classification Search
None
See application file for complete search history.

(56) References Cited

U.S. PATENT DOCUMENTS

| 6,628,610 B1* | 9/2003 | Waclawsky | H04L 47/10 |
| | | | 370/229 |
| 2003/0154216 A1* | 8/2003 | Arnold | G06F 16/211 |
| 2014/0331230 A1 | 11/2014 | Reinhardt et al. | |
| 2015/0039793 A1* | 2/2015 | Rossetti | G06F 13/385 |
| | | | 710/105 |

(Continued)

OTHER PUBLICATIONS

Mellanox Technologies, Mellanox GPUDirect RDMA User Manual, Sep. 2015, 11 pgs., Rev. 1.2 (available at: http://www.mellanox.com/related-docs/prod_software/Mellanox_GPUDirect_User_Manual_v1.2.pdf).

(Continued)

*Primary Examiner* — Charles Rones
*Assistant Examiner* — Jonah C Krieger
(74) *Attorney, Agent, or Firm* — Volpe Koenig

(57) ABSTRACT

Methods, devices, and systems for GPU cache injection. A GPU compute node includes a network interface controller (NIC) which includes NIC receiver circuitry which can receive data for processing on the GPU, NIC transmitter circuitry which can send the data to a main memory of the GPU compute node and which can send coherence information to a coherence directory of the GPU compute node based on the data. The GPU compute node also includes a GPU which includes GPU receiver circuitry which can receive the coherence information; GPU processing circuitry which can determine, based on the coherence information, whether the data satisfies a heuristic; and GPU loading circuitry which can load the data into a cache of the GPU from the main memory if on the data satisfies the heuristic.

20 Claims, 6 Drawing Sheets

(56) References Cited

U.S. PATENT DOCUMENTS

| | | | | |
|---|---|---|---|---|
| 2016/0092362 A1* | 3/2016 | Barron | ................ | G06F 12/0813 |
| | | | | 710/308 |
| 2017/0180272 A1* | 6/2017 | Bernath | .............. | H04L 49/3054 |
| 2017/0212698 A1* | 7/2017 | Bhadauria | ............ | G06F 12/0888 |
| 2018/0032435 A1* | 2/2018 | Parker | ................. | G06F 12/1009 |
| 2018/0225209 A1* | 8/2018 | Mannava | ............ | G06F 12/0891 |

OTHER PUBLICATIONS

Intel Corp., Intel Data Direct I/O Technology, 3 pgs. Accessed at: http://www.intel.com/content/www/us/en/io/data-direct-i-o-technology.html on Apr. 26, 2017.

Oden, L. et al., "InfiniBand-Verbs on GPU: A case study of controlling an InfiniBand network device from the GPU", 2014 IEEE International Parallel & Distributed Processing Symposium Workshops, May 19-23, 2014, pp. 976-983., IEEE, Phoenix, AZ, USA.

Stuart, J. et al., "Message passing on data-parallel architectures", Proceedings of the 2009 IEEE International Symposium on Parallel & Distributed Processing, May 23-29, 2009, pp. 1-12, IEEE, Rome, IT.

\* cited by examiner

NETWORK CACHE INJECTION FOR COHERENT GPUS

STATEMENT OF GOVERNMENT INTEREST

This invention was made with Government support under FastFoward-2 Node Architecture (NA) Project with Lawrence Livermore National Laboratory (Prime Contract No. DE-AC52-07NA27344, Subcontract No. B609201) awarded by DOE. The Government has certain rights in this invention.

BACKGROUND

A computer cluster in which each node is equipped with at least one graphics processing unit (GPU) can be referred to as a multi-node GPU cluster. Multi-node GPU clusters can be used in various applications, such as cloud computing, and high-performance computing (HPC). Each of the nodes of a multi-node GPU cluster can communicate with other nodes over a computer communications network using a network interface controller (NIC).

BRIEF DESCRIPTION OF THE DRAWINGS

A more detailed understanding can be had from the following description, given by way of example in conjunction with the accompanying drawings wherein.

DETAILED DESCRIPTION

Figure 1:
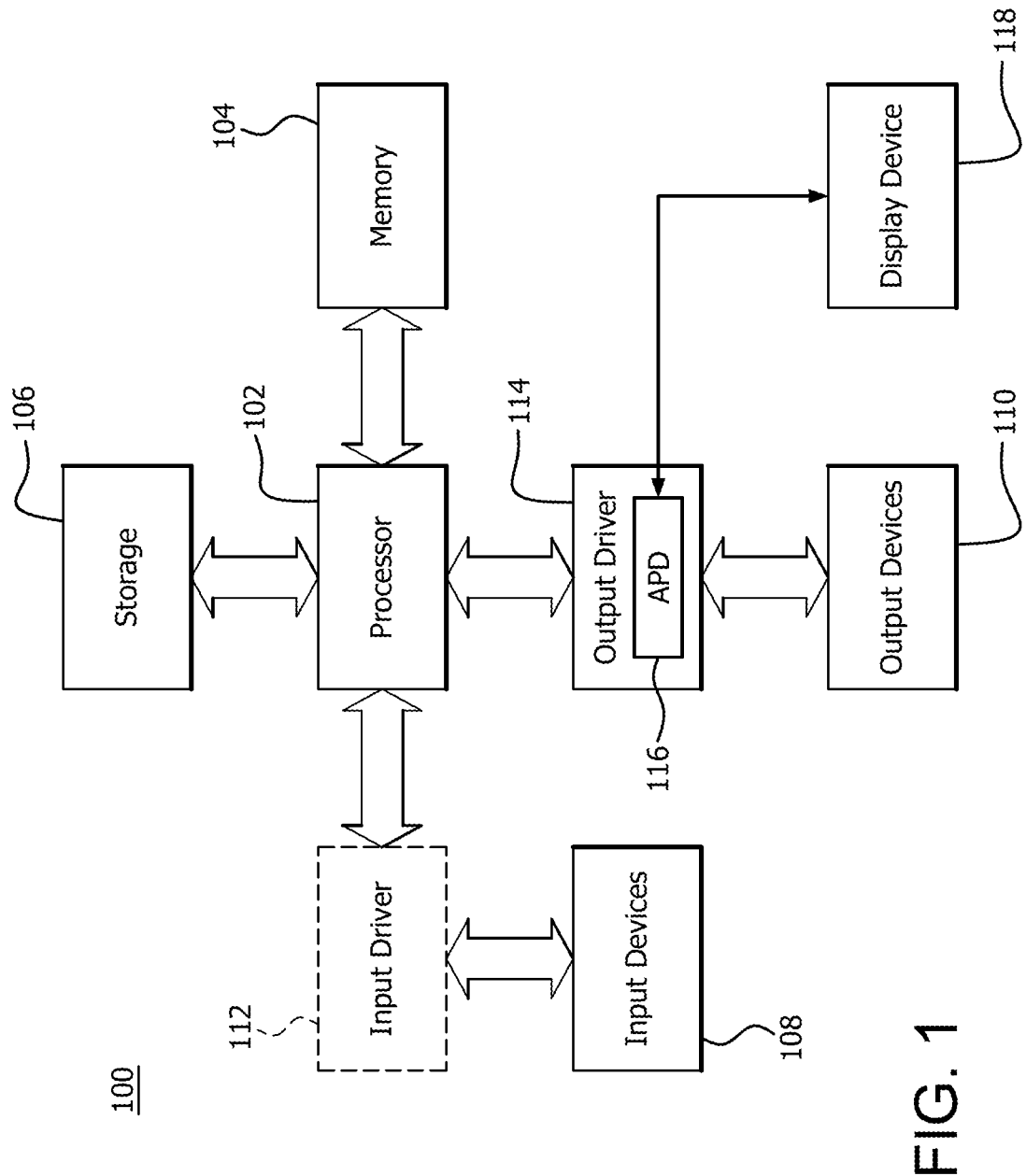
FIG. 1 is a block diagram of an example device in which one or more features of the disclosure can be implemented.

A multi-node GPU cluster can receive data from another node in the cluster over a computer communications network. Unless the node is configured for direct memory access (DMA), the GPU of the receiving node will be occupied with the task of storing the received data into memory from the NIC of the receiving node and will be unable to perform any other tasks. If the node is equipped to perform DMA transfers, the NIC of the receiving node can transfer the received data directly into the memory of the receiving node without the intervention of the GPU of the receiving node, apart from possibly initiating the transfer and/or receiving an interrupt indicating completion depending on the desired implementation. The GPU of the receiving node is thus available for other useful tasks while the received data is being stored in memory.

Direct memory transfer of data from the NIC to memory can be useful to free the GPU to perform tasks in parallel with the memory transfer. However the GPU cache will not contain a copy of the transferred data immediately after the DMA transfer. The first access of the data by the GPU will thus result in a cache miss, and the time penalties associated with detecting the cache miss and loading the data from memory. Accordingly, it may be desired to provide methods, systems, and devices for injecting data into a cache memory of the GPU in response to a data transfer from the NIC under certain conditions.

Some embodiments provide a method for inputting memory from a NIC of a GPU compute node to a cache of a GPU of the GPU compute node. The method includes the NIC receiving data for processing on the GPU, sending the data to a main memory of the GPU compute node, and sending coherence information based on the data to a coherence directory of the GPU compute node. The method also includes the GPU receiving the coherence information, determining based on the coherence information, whether the data satisfies a heuristic, and on a condition that the data satisfies the heuristic, loading the data into the cache from the main memory.

In some embodiments, the data is written by the NIC to the main memory using a DMA. In some embodiments, the GPU receives the coherence information from the NIC. In some embodiments, the GPU receives the coherence information from the directory. In some embodiments, the GPU receives the coherence information transmitted from the NIC to the coherence directory. In some embodiments, the coherence information comprises an invalidating probe. In some embodiments, the coherence information includes an indication of a data type of the data. In some embodiments, the GPU determines whether the data satisfies a heuristic based on the data type indicated in the coherence information.

Some embodiments provide a GPU compute node. The GPU compute node includes a NIC which includes NIC receiver circuitry which can receive data for processing on the GPU, NIC transmitter circuitry which can send the data to a main memory of the GPU compute node and which can send coherence information to a coherence directory of the GPU compute node based on the data. The GPU compute node also includes a GPU which includes GPU receiver circuitry which can receive the coherence information; GPU processing circuitry which can determine, based on the coherence information, whether the data satisfies a heuristic; and GPU loading circuitry which can load the data into a cache of the GPU from the main memory if on the data satisfies the heuristic.

In some embodiments, the NIC transmitter circuitry is operable to send the data to the main memory using a DMA. In some embodiments, the GPU receiver circuitry is operable to receive the coherence information from the NIC. In some embodiments, the GPU receiver circuitry is operable to receive the coherence information from the directory. In some embodiments, the GPU receiver circuitry is operable to receive the coherence information transmitted from the NIC to the coherence directory. In some embodiments, the coherence information comprises an invalidating probe. In some embodiments, the coherence information includes an indication of a data type of the data. In some embodiments, the GPU processing circuitry is operable to determine whether the data satisfies a heuristic based on the data type indicated in the coherence information.

Some embodiments provide a method for inputting memory from a NIC of a GPU compute node to a cache of a GPU of the GPU compute node. The method includes the NIC receiving data for processing on the GPU, the NIC determining whether the data satisfies a heuristic, and if the data satisfies the heuristic, loading the data into the cache from the NIC.

In some embodiments, the data is written by the NIC to the cache using a DMA. In some embodiments, the NIC transmits coherence information to a coherence directory. In some embodiments, the NIC determines whether the data satisfies a heuristic based on a data type indicated in the coherence information.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
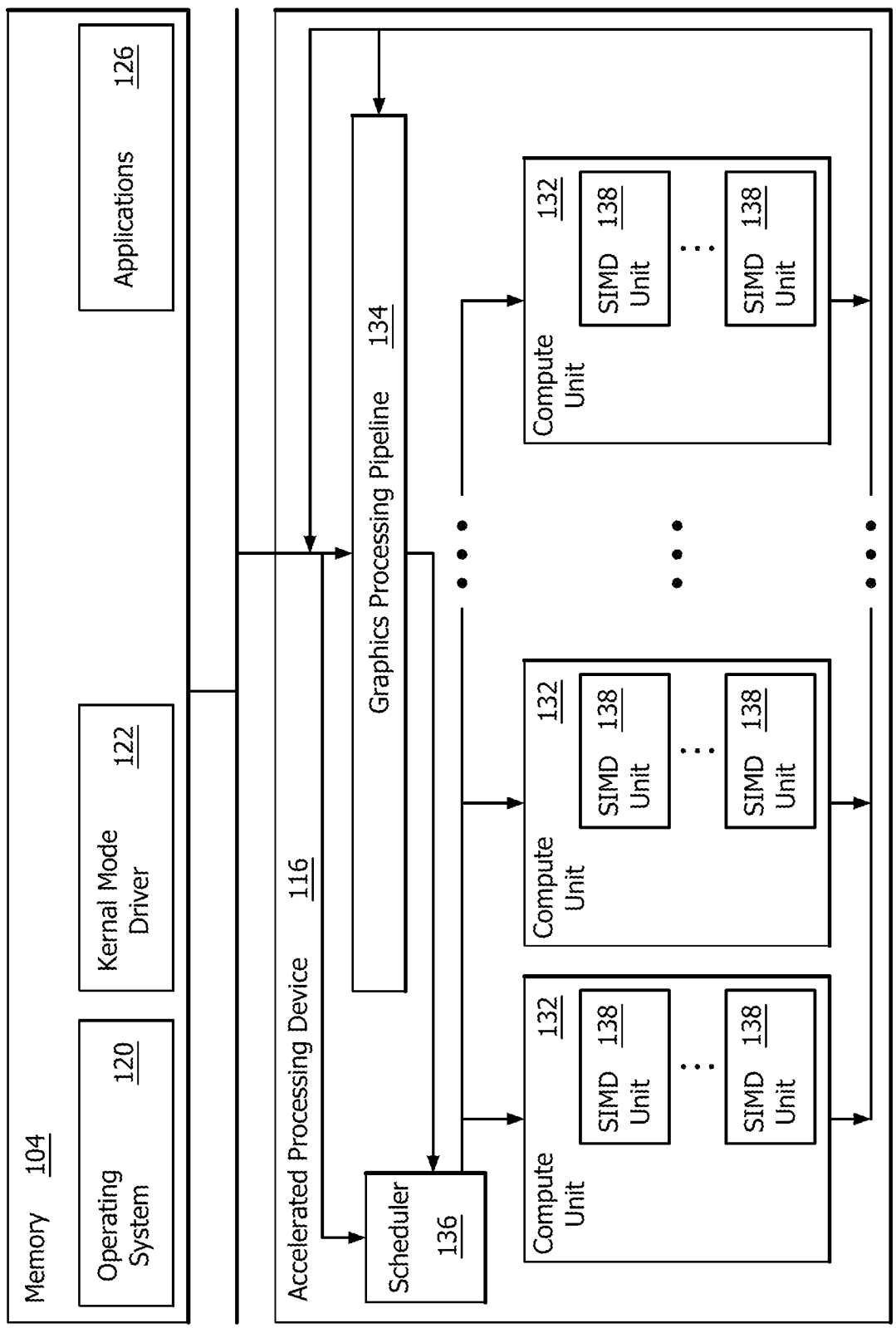
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

As discussed above, a typical GPU compute node writing data from the NIC directly to the compute unit local memory (e.g., using DMA) will suffer a delay before the data is available in the GPU LLC. This is because the data will not be available in the cache until the GPU requests data at the relevant memory address and encounters a cache miss (e.g., an indication that requested data is absent from the cache, or that the data in the relevant cache location has been marked as stale or invalid). The cache can load or "install" the requested data in appropriate cache lines in response to the cache miss, after which the data will be available for future requests from the GPU which hit those cache lines. The time required to identify the cache miss and load the requested data from memory can be substantially (e.g., orders of magnitude) higher than the time required to identify a cache hit and load data from the cache however. Such delays can also be encountered repeatedly due to data that is updated frequently or due to cache thrash, potentially causing an undesirable ratio of memory access requests that encounter a cache miss.

Accordingly, it may be desired to facilitate the movement of data from the NIC into the LLC or other cache memory of the GPU. Moving the data from the NIC closer to the GPU than in techniques that focus solely on optimizing movement from the NIC into memory can have the advantage of improving performance by avoiding or reducing accumulation of cache miss penalties during operation of the GPU compute node.

Figure 3:
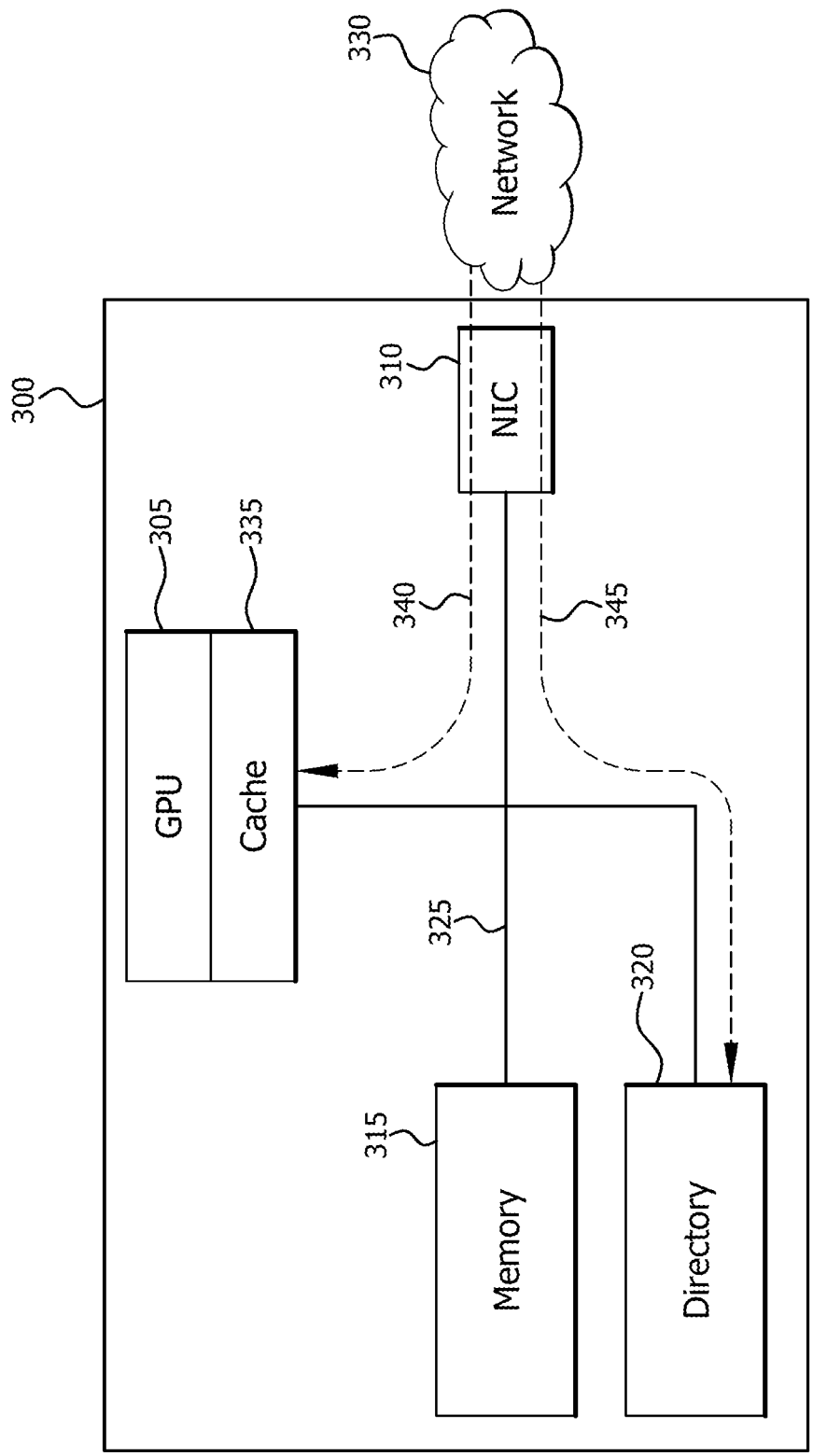
FIG. 3 is a schematic diagram illustrating an example compute node which is configured for GPU cache injection.

FIG. 3 is a schematic diagram illustrating an example compute node 300 which is configured for GPU cache injection. Compute node 300 includes GPU 305, NIC 310, memory 315, coherence directory 320, and local interconnect 325. Compute node 300 can be implemented, for example, using components of device 100 as shown and described with respect to FIG. 1. Compute node 300 can include any other suitable components (e.g., a CPU) which are omitted for clarity in FIG. 3. For example, compute node 300 can include or can form a part of a heterogeneous system architecture (HSA) or APD (such as APD 116 shown and described with respect to FIG. 1) and can include a CPU and/or other GPUs which share memory 315.

GPU 305 can include any suitable graphics processing device or core. GPU 305 can be implemented as a core on the same die as a CPU, (e.g., in an APD arrangement) or can be disposed on a separate die. GPU 305 can be implemented, for example, on processor 102 or APD 116, (e.g., as a compute unit 132) shown and described with respect to FIG. 1. GPU 305 also includes a local GPU cache 335. Cache 335 can be or include a last level cache (LLC). In various implementations GPU 305 can include other cache levels or caches (not shown). GPU 305 is coherent with other agents in the compute node using a directory-based cache coherence protocol. GPU 305 and GPU cache 335 maintain cache coherence with other agents in the system, using coherence directory 340. Coherence directory 340 can be implemented in any suitable location, such as in memory 315.

NIC 310 is in communication with and is an interface between local interconnect 325 and network 300, and provides communications to network 330 for compute node 300 (and components of compute node 300 such as GPU 305) via local interconnect 325. NIC 310 can include circuitry which is operable to determine whether incoming data should be "injected" into cache 335 by writing the data to cache 335 from NIC 310. Such circuitry can include, for example, an embedded processor core executing heuristics logic. In other examples, the filtering and/or heuristics can be performed in any suitable manner using any suitable structure including any suitable hardware and/or software. NIC 310 can also include a NIC memory, cache, and/or buffer.

Memory 315 can include any suitable non-transitory computer readable memory, such as a random access memory (RAM). Memory 315 can be implemented, for example, as memory 104 or onboard APD 116, compute unit 132, or output driver 114 (shown and described with respect to FIG. 1). Memory 315 is in communication with GPU 305, NIC 310, coherence directory 320, and cache 335 over local interconnect 325. GPU 305 can share memory 315 with other computing devices, such as a CPU (not shown), which can also be a part of compute node 300 and can communicate with memory 315 using local interconnect 325.

Coherence directory 320 is used to maintain coherency between values stored in memory 315 and corresponding values stored in cache 335. Coherence directory 340 can be implemented in any suitable location, such as in memory 315. Coherence directory 320 tracks ownership and coherence state for all the cached lines in the system.

Local interconnect 325 can include any suitable bus or other medium for interconnecting devices within a computer, compute node, or other hardware, such as a Peripheral Component Interconnect Express (PCIe) bus. Network 330 can include any suitable computer communications network for communicating with a remote compute or other node, such as an InfiniBand network, Ethernet, and/or the Internet or any portion thereof. For example, in a multi-node GPU cluster, compute node 300 can receive data 340 from other GPU nodes over network 330 via NIC 310. The operation of compute node 300 can also be generalized to systems other than multi-node GPU clusters, and can receive data 340 from other types of nodes, such as CPU compute nodes, in some implementations.

Data 340 can be received from a remote node over network 330 by NIC 310 for processing by GPU 305. An example of such data includes information needed by applications running on GPU 305 to make forward progress (i.e., information needed by applications running on GPU 305 to continue execution on GPU 305). Not all GPU-bound data from network 330 is suitable for injection into cache 335.

For example, data files that exceed the size of cache 335 would be inappropriate to inject as they would not fit into cache 335 and could evict other useful cached information. The filtering circuitry of NIC 310 can determine whether data 340 should be injected into cache 335 or should be written to memory 315 without cache injection. For example, the filtering circuitry of NIC 310 can apply one or more heuristics or criteria to determine whether to inject data 340 into cache 335.

Example heuristics include, for example, network header injection, command packet injection, and small data payload injection. An example network header injection heuristic, applied by the filter of NIC 310, can cause the NIC 310 to inject a network header portion of data 340 into cache 335. This type of header may be used, for example, where the GPU 305 is waiting to receive a network packet. In this situation, it can make sense to inject the packet header into cache 335, since polling on a network header is typically a latency sensitive operation that blocks forward progress on the application running on the GPU. An example command packet injection heuristic, applied by the filter of NIC 310, can cause NIC 310 to inject data 340 into cache 335 if it is a command packet, (e.g., detailing a kernel to be launched by the GPU). Command packets will be sent by another device to GPU 305 through the network if the command packet requires data that is already resident on GPU 305. In some implementations, the command packet can be injected into a local cache of a command processor (CP) of GPU 305 rather than an LLC or other cache of the GPU, if the CP itself has a local cache. An example small data payload heuristic, applied by the filter of NIC 310, can cause NIC 310 to inject data 340 into cache 335 if it has a small enough payload (e.g., below a certain threshold size. The threshold size may be determined based on the size of cache 335, for example, based on the replacement strategy implemented in cache 335, or based on any other suitable criteria).

In the example of FIG. 3, NIC 310 determines, based on its heuristics, that the received data 340 should be injected, and injects the received data 340 into cache 335 over local interface 325. Depending on the desired implementation, data 340 can be written to memory 315 at this point, or after a write-back from cache 335 depending on whether cache 335 is write-through or write back. NIC 310 also sends coherence traffic 345 to coherence directory 320 over local interface 325 to update the coherence state of the data. Coherence traffic 345 includes signaling which indicates control information for the coherence directory 320. For example, coherence traffic 345 may cause coherence directory 320 to enter a state indicating that corresponding cache entries in other caches are invalid. Coherence traffic 345 can cause a local cache of a different GPU, which shares memory 315 with GPU 305, to flush its corresponding cache entry, which is now invalid. Coherence traffic 345 can cause coherence directory 320 to issue any number of invalidation probes to other agents' caches in the system. An invalidation probe is a message indicating that information in a receiving cache for a particular cache line is invalid. In some implementations, this indication can simply be the address of the cache line. The probe can include bits indicating that the data 345 is from a NIC, and/or a type of data 345 (e.g., that data 345 is associated with a network header). The probe is a control plane signal, and can be implementation-specific.

The cache injection described with respect to FIG. 3 can be described as "pushing" received network data from the NIC into the cache. However, caches are typically constructed in a way that makes it difficult to "push" data directly into the cache. Caches are typically designed to fetch data from a memory, not to have data directly written into them. Accordingly, implementing GPU cache injection as described with respect to FIG. 3 may require substantial modification to a typical GPU cache and/or the coherence hardware of compute node 300.

Figure 4:
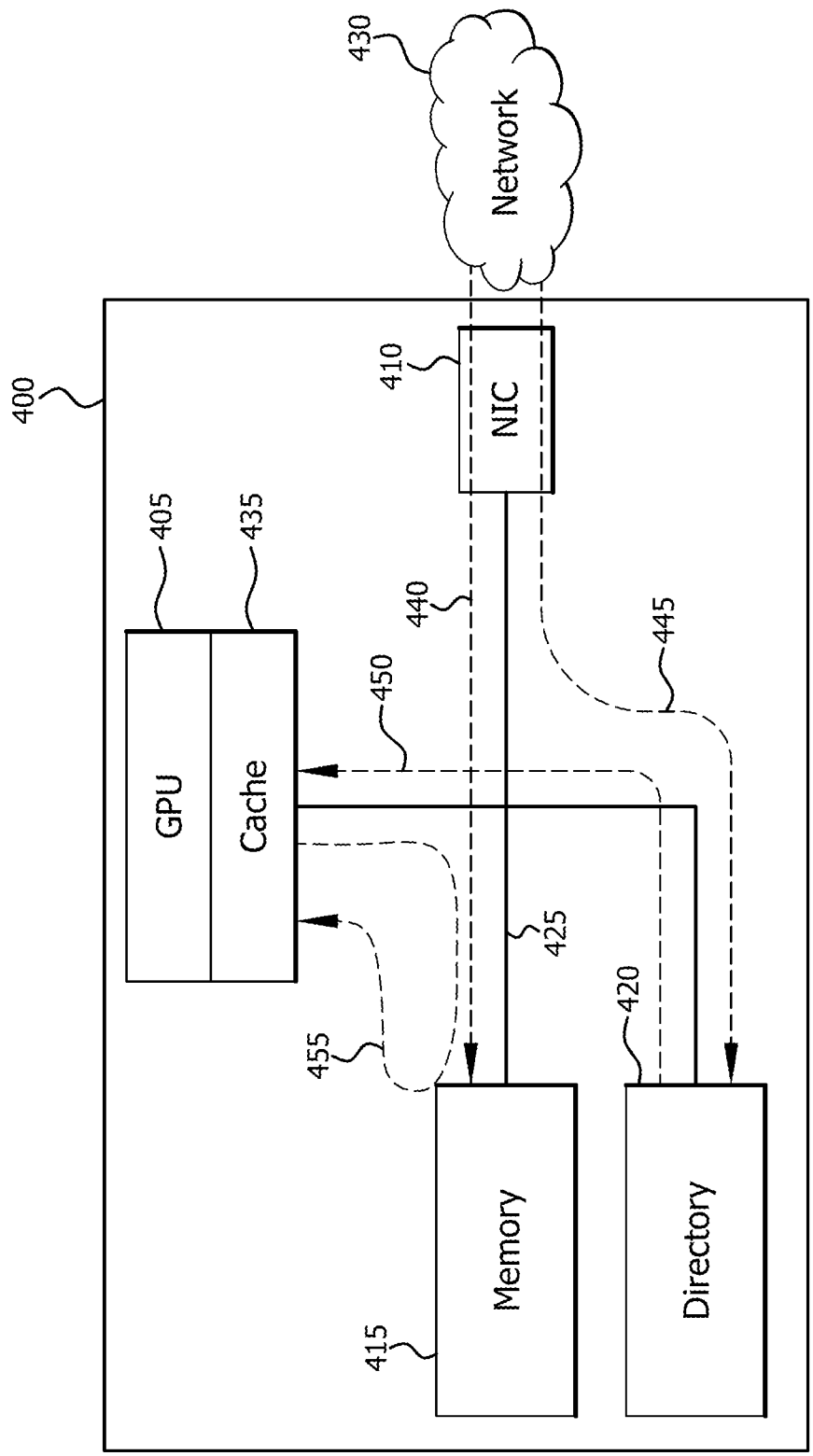
FIG. 4 is a schematic diagram illustrating an example compute node which is configured for prefetching-type GPU cache injection.

FIG. 4 is a schematic diagram illustrating an example compute node 400 which is configured for prefetching-type GPU cache injection. Compute node 400 is similar in some respects to compute node 300 shown and described with respect to FIG. 3, and includes GPU 405, NIC 410, memory 415, coherence directory 420, and local interconnect 425. Compute node 400 can be implemented, for example, using components of device 100 as shown and described with respect to FIG. 1. Compute node 400 can include any other suitable components (e.g., a CPU) which are omitted for clarity in FIG. 4. For example, compute node 400 can include or can form a part of a HSA or APD (such as APD 116 shown and described with respect to FIG. 1) and can include a CPU and/or other GPUs which share memory 415.

GPU 405 can include any suitable graphics processing device or core. GPU 405 can be implemented as a core on the same die as a CPU, (e.g., in an APD arrangement) or can be disposed on a separate die. GPU 405 can be implemented, for example, on processor 102 or APD 116, (e.g., as a compute unit 132) shown and described with respect to FIG. 1. GPU 405 also includes a local GPU cache 435. Cache 435 can be or include a last level cache (LLC). In various implementations GPU 405 can include other cache levels or caches (not shown). GPU 305 is coherent with other agents in the compute node using a directory-based cache coherence protocol. GPU 405 and GPU cache 435 maintain cache coherence, using coherence directory 440. Coherence directory 440 can be implemented in any suitable location, such as in memory 415.

NIC 410 is in communication with and is an interface between local interconnect 425 and network 400, and provides communications to network 430 for compute node 400 (and components of compute node 400 such as GPU 405) via local interconnect 425. NIC 410 can include circuitry which is operable to determine whether incoming data should be injected into cache 435 by prefetching. Such circuitry can include, for example, an embedded processor core executing heuristics logic. In other examples, the filtering and/or heuristics can be performed in any suitable manner using any suitable structure including any suitable hardware and/or software. NIC 410 can also include a NIC memory, cache, and/or buffer.

Memory 415 can include any suitable non-transitory computer readable memory, such as a random access memory (RAM). Memory 415 can be implemented, for example, as memory 104, or onboard APD 116, compute unit 132, or output driver 114 (shown and described with respect to FIG. 1). Memory 415 is in communication with GPU 405, NIC 410, coherence directory 420, and cache 435 over local interconnect 425. GPU 405 can share memory 415 with other computing devices, such as a CPU (not shown), which can also be a part of compute node 400 and can communicate with memory 415 using local interconnect 425.

Coherence directory 420 is used to maintain coherency between values stored in memory 415 and corresponding values stored in cache 435. The coherence directory tracks ownership and coherence state for all the cached lines in the system.

Local interconnect 425 can include any suitable bus or other medium for interconnecting devices within a computer, compute node, or other hardware, such as a Peripheral Component Interconnect Express (PCIe) bus. Network 430 can include any suitable computer communications network for communicating with a remote compute or other node, such as an InfiniBand network, Ethernet, and/or the Internet or any portion thereof. For example, in a multi-node GPU cluster, compute node 400 can receive data 440 from other GPU nodes over network 430 via NIC 410. The operation of compute node 400 can also be generalized to systems other than multi-node GPU clusters, and can receive data 440 from other types of nodes, such as CPU compute nodes, in some implementations.

Data 440 can be received from a remote node over network 430 by NIC 410 for processing by GPU 405. Examples of such data include information needed by applications running on the GPU to make forward progress (i.e., information needed by applications running on GPU 305 to continue execution on GPU 305). Not all GPU-bound data from network 430 is suitable for injection into cache 435. For example, data files that exceed the size of cache 435 would be inappropriate to inject as they would not fit into cache 435 and could evict other useful cached information. The filtering circuitry of NIC 410 can determine whether data 440 should be injected into cache 435 or should be passed normally to memory 415. For example, the filtering circuitry of NIC 410 can apply one or more heuristics to determine whether to inject data 440 into cache 435.

Example heuristics include, for example, network header injection, command packet injection, and small data payload injection. An example network header injection heuristic, applied by the filter of NIC 410, can cause the NIC 410 to inject a network header portion of data 440 into cache 435. This type of header may be used, for example, where the GPU 405 is waiting to receive a network packet. In this situation, it can make sense to inject the packet header into cache 435, since polling on a network header that blocks forward progress on the application running on the GPU. An example command packet injection heuristic, applied by the filter of NIC 410, can cause NIC 410 to inject data 440 into cache 435 if it is a command packet, e.g., detailing a kernel to be launched by the GPU Command packets will be sent by another device to GPU 305 through the network if the command packet requires data that is already resident on GPU 305. In some implementations, the command packet can be injected into a local cache of a command processor (CP) of GPU 405 rather than an LLC or other cache of the GPU, if the CP itself has a local cache. An example small data payload heuristic, applied by the filter of NIC 410, can cause NIC 410 to inject data 440 into cache 435 if it has a small enough payload (e.g., below a certain threshold size. The threshold size may be determined based on the size of cache 435, for example, based on the replacement strategy implemented in cache 435, or based on any other suitable criteria).

In the example of FIG. 4, NIC 410 writes the received data 440 into memory 415 over local interface 425. NIC 410 can write the received data 440 into memory 415 using direct memory access (DMA) for example. NIC 410 also sends coherence traffic 445 to coherence directory 420 over local interface 425 to update the coherence state of the data. Coherence traffic 445 causes coherence directory 420 to enter a state indicating that corresponding cache entry or entries in cache 435 is or are invalid and that new data is available in memory 415 and is to be loaded into the cache 435. Coherence directory 420 sends an invalidation probe 450, which is received by cache 435. Probe 450 indicates that data 440 is now available and can be prefetched by cache 435 into its appropriate cache line or lines. Probe 450 functions as a "hint" that the cache can prefetch data 440—the prefetching is not mandatory. For example, probe 450 can include bits indicating that the data 445 is from a NIC, and/or a type of data 445 (e.g., that data 445 is associated with a network header). The bits can be used to drive heuristics for determining whether to prefetch data from memory 415 into cache 435. For example, GPU 405 and/or cache 435 can include hardware configured to determine whether to prefetch data based on the hint. The hardware may implement heuristics similar to the filtering circuitry in NIC 410 for example. In this example, cache 435 determines that it should prefetch data 440 and executes prefetch 455 to load data 440 into its appropriate cache line or lines.

The cache injection described with respect to FIG. 4 can be described as "prefetching" received network data from the NIC into the cache.

Figure 5:
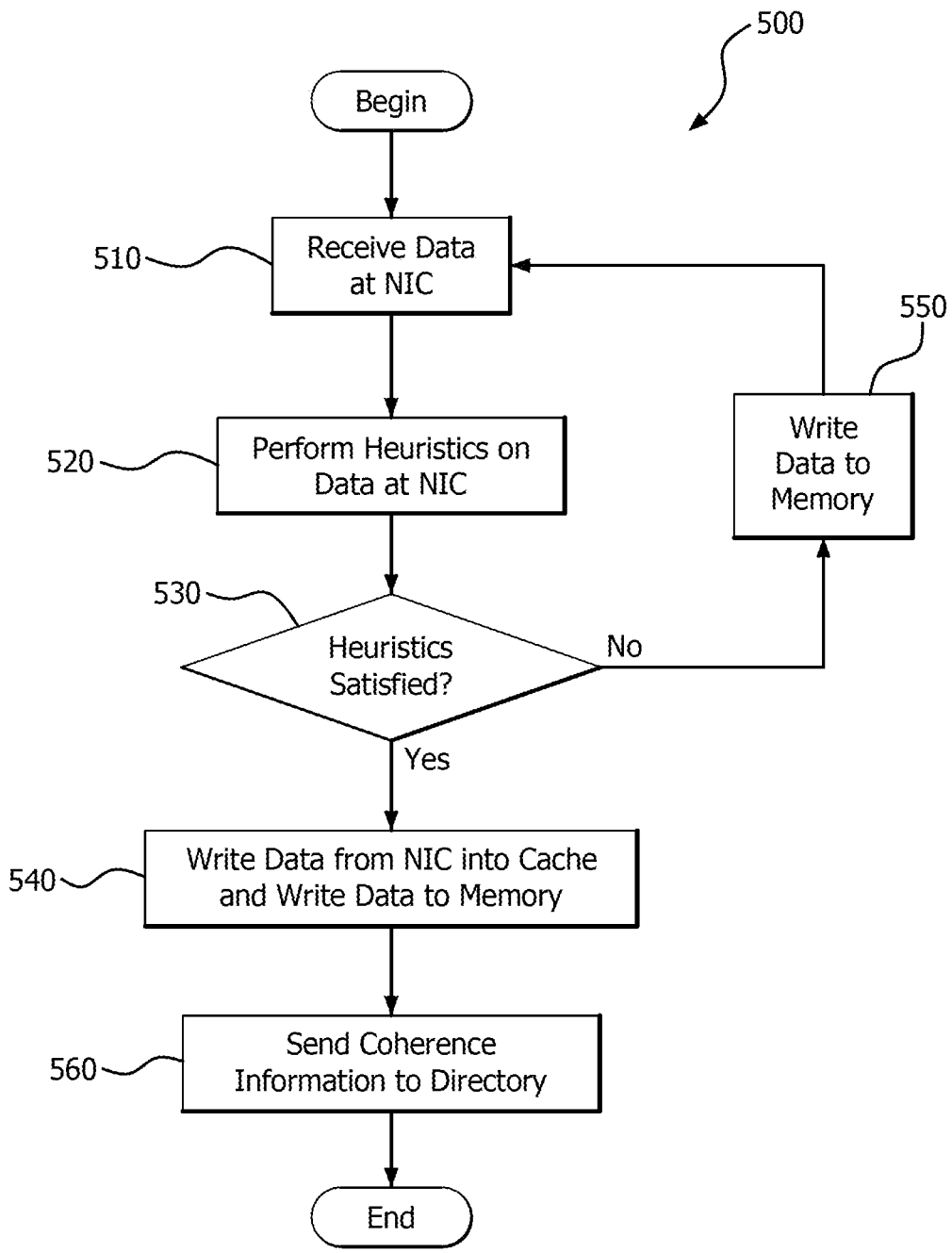
FIG. 5 is a flow chart illustrating an example method for GPU cache injection.

FIG. 5 is a flow chart illustrating an example method 500 for GPU cache injection. Method 500 is useable with compute node 300 as shown and described with respect to FIG. 3, or any other suitable compute node. In this example, method 500 describes operations for a GPU compute node which includes a GPU, GPU cache, NIC, memory, coherence directory, and local interconnect.

In step 510, the GPU compute node receives data at the NIC from a network. The data can be received over the network from another GPU compute node, or from any other suitable data source.

In step 520, the NIC determines whether the data should be injected into the GPU cache or written to the memory without cache injection. For example, filtering circuitry of the NIC can apply one or more heuristics to determine whether or not to inject the received data into the GPU cache. Example heuristics include, for example, network header injection, command packet injection, and small data payload injection as further described above.

On a condition 530 that the NIC determines that the data should be injected into the cache, the NIC writes the data to the cache in step 540. Depending on the desired implementation, the data can be written to memory at this point, or after a write-back from the cache depending on whether the cache is write-through or write back. The NIC sends coherence information to the coherence directory in step 560. The write to memory can be performed, e.g., using DMA. Otherwise, the NIC writes the data to the memory without writing the data to the cache in step 550.

Figure 6:
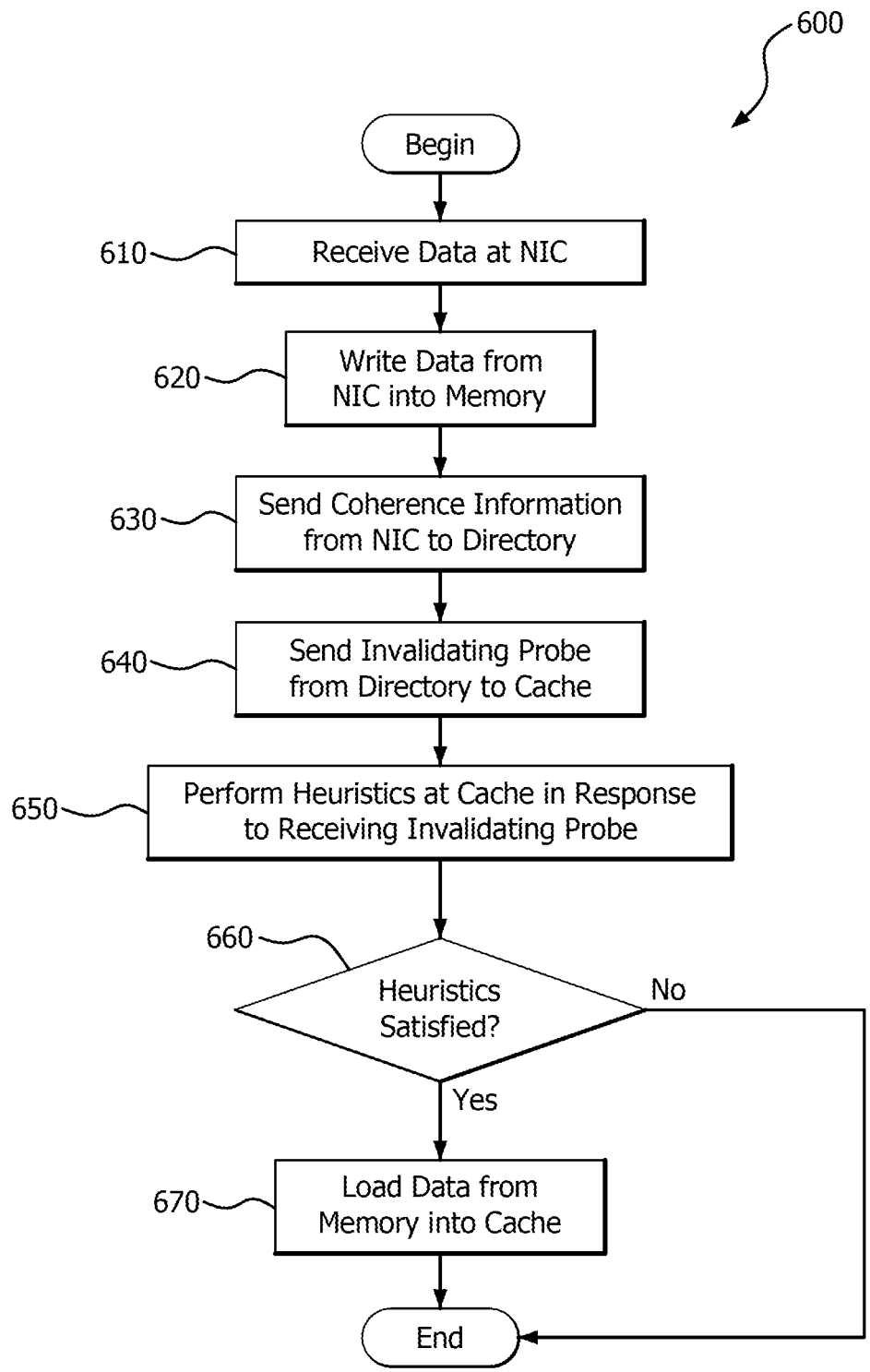
FIG. 6 is a flow chart illustrating an example method for GPU cache injection using prefetching.

FIG. 6 is a flow chart illustrating an example method 500 for GPU cache injection using prefetching. Method 600 is useable with compute node 400 as shown and described with respect to FIG. 4, or any other suitable compute node. In this example, method 600 describes operations for a GPU compute node which includes a GPU, GPU cache, NIC, memory, coherence directory, and local interconnect.

In step 610, the GPU compute node receives data at the NIC from a network. The data can be received over the network from another GPU compute node, or from any other suitable data source.

In step 620, the NIC writes the received data to the memory (e.g., using DMA). In step 630, the NIC sends coherence information to the coherence directory. Steps 630 can follow step 620, or these steps can be performed concurrently, simultaneously, or otherwise can overlap in time. In step 640, the coherence directory sends an invalidation probe to the cache in reaction to receiving the coherence information from the NIC.

In step 650, the cache determines whether or not the received data should be prefetched. The determination can be based on various heuristics as discussed above. On a condition 660 that the heuristic or heuristics are satisfied (or that the cache otherwise determines to prefetch the received data) the cache loads the received data from the memory into an appropriate cache line or lines.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for inputting memory from a network interface controller (NIC) of a graphics processing unit (GPU) compute node to a cache of a GPU of the GPU compute node, the method comprising:
   receiving, by the NIC, data for processing on the GPU;
   sending, by the NIC, the data to a main memory of the GPU compute node;
   sending, by the NIC, coherence information to a coherence directory of the GPU compute node based on the data, the coherence information indicating that a cache entry of the cache is invalid;
   receiving, by the GPU, the coherence information;
   determining, by the GPU, based on the coherence information, whether the data includes a network header or a command packet; and
   loading the data into the cache from the main memory of the GPU compute node responsive to the data being determined to include the network header or the command packet.

2. The method of claim 1, wherein the data is written by the NIC to the main memory using a direct memory access (DMA).

3. The method of claim 1, wherein the GPU receives the coherence information from the NIC.

4. The method of claim 1, wherein the GPU receives the coherence information from the coherence directory.

5. The method of claim 1, wherein the GPU receives the coherence information transmitted from the NIC to the coherence directory.

6. The method of claim 1, wherein the coherence information comprises an invalidating probe.

7. The method of claim 1, wherein the coherence information includes an indication of a data type of the data.

8. The method of claim 7, wherein the GPU determines whether the data satisfies a heuristic based on the data type indicated in the coherence information.

9. A graphics processing unit (GPU) compute node comprising:
   a GPU comprising a GPU cache;
   a network interface controller (NIC) configured to receive data for processing on the GPU;
   the NIC further configured to send the data to a main memory of the GPU compute node;
   the NIC further configured to send coherence information to a coherence directory of the GPU compute node based on the data, the coherence information indicating that a cache entry of the GPU cache is invalid;
   the GPU configured to receive the coherence information;
   the GPU further configured to determine, based on the coherence information, whether the data includes a network header or a command packet;
   the GPU further configured to load the data into the GPU cache from the main memory of the GPU compute node responsive to the data being determined to include the network header or the command packet.

10. The GPU of claim 9, wherein the NIC is configured to send the data to the main memory using a direct memory access (DMA).

11. The GPU of claim 9, wherein the GPU is configured to receive the coherence information from the NIC.

12. The GPU of claim 9, wherein the GPU is configured to receive the coherence information from the coherence directory.

13. The GPU of claim 9, wherein the GPU is configured to receive the coherence information transmitted from the NIC to the coherence directory.

14. The GPU of claim 9, wherein the coherence information comprises an invalidating probe.

15. The GPU of claim 9, wherein the coherence information includes an indication of a data type of the data.

16. The GPU of claim 15, wherein the GPU is configured to determine whether the data satisfies a heuristic based on the data type indicated in the coherence information.

17. A method for inputting memory from a network interface controller (NIC) of a graphics processing unit (GPU) compute node to a cache of a GPU of the GPU compute node, the method comprising:
   receiving, by the NIC, data for processing on the GPU;
   sending, by the NIC, the data to a main memory of the GPU compute node;
   determining, by the NIC, whether the data includes a network header or a command packet;
   responsive to the data being determined to include the network header or the command packet, sending coherence information to a coherence directory of the compute node based on the data, the coherence information indicating that a cache entry of the cache is invalid; and
   responsive to the coherence information, writing the data into the cache from the main memory of the GPU compute node.

18. The method of claim 17, wherein the data is written by the NIC to the main memory of the GPU using a direct memory access (DMA).

19. The method of claim 17, wherein the coherence information indicates a data type of the data.

20. The method of claim 19, wherein the NIC determines whether the data satisfies a heuristic based on a data type of the data.

* * * * *